April 27, 1954     J. J. DODSON     2,676,526
FURROW WHEEL
Filed Feb. 9, 1951     2 Sheets-Sheet 2
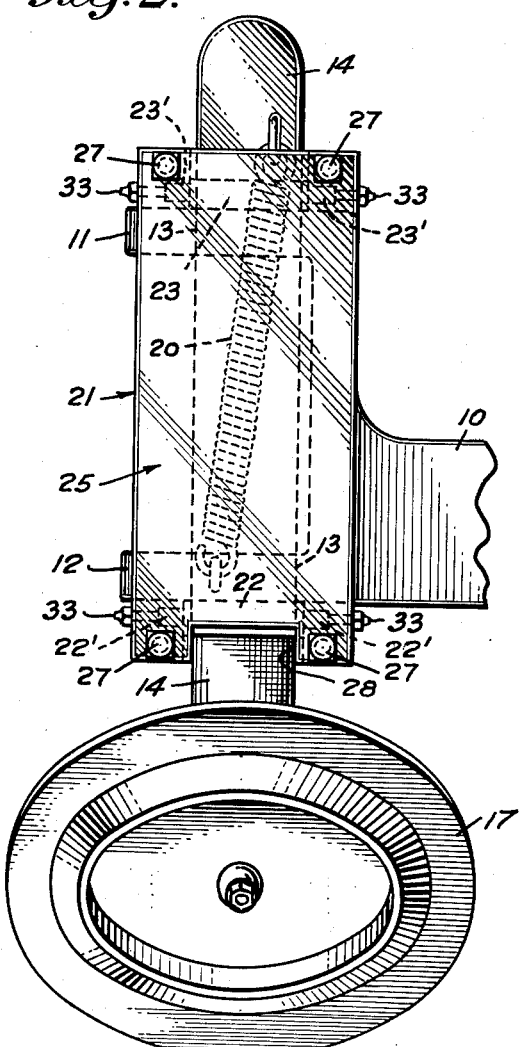
Fig. 2.
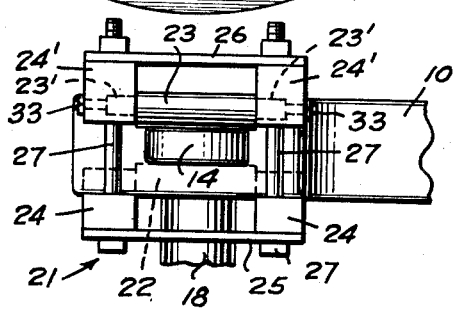
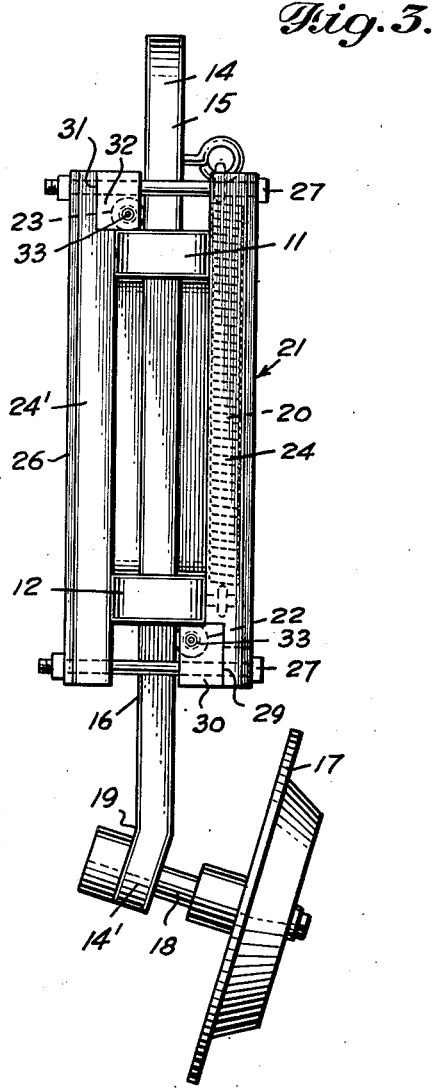
Fig. 3.
Fig. 4.
INVENTOR
John J. Dodson,
BY Flocks and Simon
ATTORNEYS Patented Apr. 27, 1954

2,676,526

UNITED STATES PATENT OFFICE 2,676,526

FURROW WHEEL

John J. Dodson, Broad Top City, Pa.

Application February 9, 1951, Serial No. 210,266

9 Claims. (Cl. 97—189)

This invention relates to a furrow wheel attachment for a plow and more particularly to a resilient mounting for the furrow wheel of a tractor drawn plow.

In the past, various constructions have been proposed for mounting a furrow wheel resiliently onto a plow to enable the wheel to roll over stones or other hard objects in the soil without damage to the furrow wheel and without raising the plow from the earth. However, a great deal of difficulty has been experienced with the prior structures due to the sticking of the furrow wheel in its up position and its failure to return promptly to the operative position, thereby causing the plow to vary in its depth of cut. Similarly, difficulty has been experienced due to the plow sticking in its up position upon hitting a stone or other hard object, at which time the furrow wheel is lower than the plow.

It is an object of the present invention to provide a resilient furrow wheel support which permits the wheel and the plow to roll over rocks or the like without varying the depth of cut of the plow.

It is a further object of the invention to provide an anti-friction device to a resilient support for a furrow wheel of a plow to permit free movement up as well as down of the furrow wheel and the plow with respect to one another.

A still further object of the invention is to provide a device for attachment to the supporting frame of a plow to support resiliently a furrow wheel and to permit free movement up as well as down of the wheel with a means of lubrication that automatically cleans the bearings of dirt.

Other objects and the nature and advantages of the instant invention will be apparent from the following description taken in conjunction with the accompanying drawings, wherein:

Fig. 2 is a side elevation of the support;

Fig. 3 is an end elevation of the support shown in Fig. 2, and

Fig. 4 is a plan view of the support shown in Fig. 2.

Figure 1:
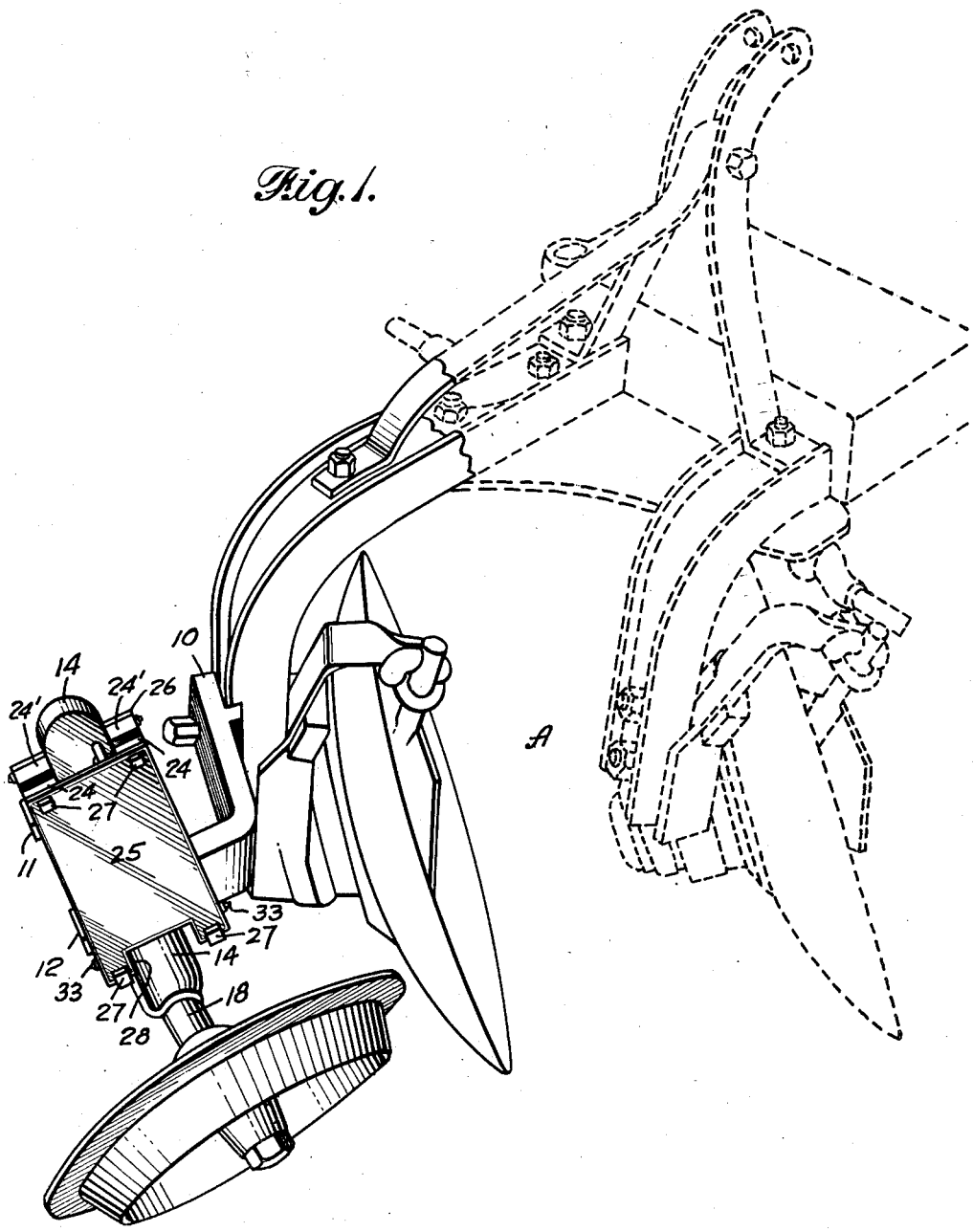
Figure 1 is a perspective view of the furrow wheel support shown in combination with a disc plow.

Referring to the drawings, the reference character A designates generally a pair of disc plows secured to a supporting frame which is adapted to be drawn behind a tractor or other motive power. Hydraulic or other means, not shown, are provided for lifting and lowering the frame and the plows from the earth. In operating this type of plow, the force of the soil on the inclined discs creates a thrust to one side of the line of motion of the plow. To prevent the plows from crowding to one side, it is desirable to provide a furrow wheel with a cutting edge to follow behind the plow in the furrow previously made by the plows. The furrow wheel stands at an angle and tends to keep the plow running in a straight line while opening up the furrows.

A supporting bar 10 is attached at one end to the supporting frame of the plow. The opposite end of supporting bar 10 is bifurcated into two vertically spaced parallel arms 11 and 12. Each parallel arm 11 and 12 is provided with an opening 13 therethrough, the openings being in vertical alignment to hold a carrier arm 14 which passes through the openings 13. The cross section of the carrier arm as shown is rectangular, having two flat opposed surfaces 15 and 16. A furrow wheel 17 mounted on a shaft 18 is attached to the lower end of carrier arm 14. The carrier arm 14 is bent at point 19 near its lower end, so that the lower portion 14' of said arm, to which the furrow wheel is attached, is not in a vertical plane. In this manner, the furrow wheel 17 is mounted at an angle to the vertical, yet is able to reciprocate in a vertical direction due to the vertical movement of the carrier arm 14 through the openings 13 in the support arm 10. A spring 20 is attached at its upper end to the carrier arm 14 at its lower end to the lower parallel arm 12. Thus, whenever the carrier arm 14 moves with respect to the parallel arms 12 due to the furrow wheel 17 meeting an obstacle in its path, the spring 20 is tensioned so that when the obstacle has been passed, the spring tends to return the carrier arm 14 to its original operative position.

Enclosing the parallel arms 11 and 12 is a frame structure 21 which houses rollers 22 and 23. The frame structure 21 includes four vertical bars 24, 24', two of which are arranged on each side of the parallel arms 11 and 12. A cover plate 25 extends across two of the vertical bars 24 enclosing one side of the frame, whereas cover plate 26 encloses the space between vertical bars 24' on the other side of the frame. Bolts 27 extend across the frame structure securely clamping the bars 24, 24' and plates 25 and 26 to the parallel arms 12. The lower end of plate 25 is cut away at the center portion as shown at 28 in a rectangular cut to permit the entry of shaft 18 if the carrier arm should rise to that extent. The lower end of vertical bars 24 are each cut away at 29 to receive a block 30. The upper end of vertical bars 24' are each cut away at 31 to receive a block 32. The bolts 27 extend through holes in the blocks 30 and 32 to retain them in position. The blocks 30 and 32 are bored to act as bearings for the rollers 22 and 23, respectively. The ends of the rollers 22 and 23 are reduced in diameter at 22' and 23' and are journalled in the blocks 30 and 32 so as to permit free rotation of the rollers.

Lubrication fittings 33 are provided on the outer surfaces of blocks 30 and 32 in line with the rollers 22 and 23. Thus, when a lubricant is forced into the fittings 33, any dirt or foreign matter will be forced out of the bored holes in the blocks 30 and 32, assuring dirt free bearing surfaces therein.

The rollers 22 and 23 extend across the frame 21 between adjacent blocks 30 and 32 and their surfaces are in contact with surfaces 15 and 16 respectively of the carrier arm 14. As the carrier arm 14 rises with respect to the parallel arms 12, the rollers 22 and 23 rotate along the opposite surfaces 15 and 16 thus reducing friction and permitting smooth operation of the device. The rollers cooperate with the spring 29 to insure the return of the carrier arm to its initial position and prevent the sticking of the furrow wheel carrier arm. The lubrication devices maintain the bearings for the rollers free of dirt and permit free rotation of the rollers with the carrier arm.

The combination of elements described above is easily assembled resulting in a simple device which permits the movement of the furrow wheel in a vertical direction both up and down, in a smooth manner without sticking whenever an obstacle is encountered.

It will be obvious to those skilled in the art that various changes may be made without departing from the spirit of the invention and the invention is not limited to what is shown in the drawings and described in the specification, but only as indicated in the appended claims.

What is claimed is:

1. In a support for a furrow wheel of a plow in which said furrow wheel is resiliently mounted on a carrier arm, a pair of vertically spaced parallel arms mounted on said plow, said parallel arms having vertically aligned openings formed therein, said carrier arm extending through said openings in said parallel arms and adapted to reciprocate therein in a vertical direction with respect to said plow, means for resiliently mounting said carrier arm, frame means secured to said parallel arms, a pair of rollers rotatably mounted on said frame means adjacent said carrier arm and in contact with opposite surfaces thereof so that said rollers rotate in contact with said carrier arm surfaces as said carrier arm moves in a vertical direction with respect to said plow.

2. In a device in accordance with claim 1, lubrication fittings provided on said frame means in alignment with the axes of said rollers, one fitting being provided at each end of each said roller.

3. In a device in accordance with claim 1, said carrier arm having two longitudinally extending parallel surfaces each of which is always in contact with one of said rollers.

4. In a support for a furrow wheel of a plow in which said furrow wheel is resiliently mounted on a carrier arm, a pair of vertically spaced parallel arms mounted on said plow, said parallel arms having vertically aligned openings formed therein, said carrier arm extending through said openings in said parallel arms and adapted to reciprocate therein in a vertical direction with respect to said plow, a pair of rollers rotatably mounted adjacent said carrier arm and in contact with opposite surfaces thereof so that said rollers rotate in contact with said carrier arm surfaces as said carrier arm moves in a vertical direction with respect to said plow, a frame surrounding the upper portion of said carrier arm, bearing surfaces in said fame adapted to receive the ends of said rollers, and a spring mounted within said frame, said spring being attached at one end to said carrier arm and at the other end to the frame to which said plow is attached.

5. In a device in accordance with claim 4, said carrier arm having two longitudinally extending parallel surfaces each of which is always in contact with one of said rollers, and lubrication fittings provided on said frame in alignment with the axes of said rollers, one fitting being provided at each end of each said roller.

6. In a support for a furrow wheel of a plow, a supporting bar extending from the plow, a bifurcated end to said bar having two vertically spaced parallel arms, an opening in each of said arms, said openings being in vertical alignment, a carrier arm extending through said openings and adapted to reciprocate therein, a furrow wheel attached to the lower end of said carrier arm, a frame structure clamped to said parallel arms, a spring attached at one end to said carrier arm and at its other end to one of said parallel arms, a pair of rollers each end of which is journalled in said frame the surface of each roller being in engagement with an opposite surface of said carrier arm and rotating as said carrier arm moves up and down so as to cooperate with said spring to bring said furrow wheel back to its starting position each time that the carrier arm moves upwardly within said frame.

7. In a device in accordance with claim 6, said carrier arm having two longitudinally extending parallel surfaces each of which is always in contact with one of said rollers.

8. In a device in accordance with claim 6, a lubrication fitting provided on the outer surfaces of said frame aligned with the axes of said rollers at each end of each said roller.

9. In a device in accordance with claim 8, said carrier arm having two longitudinally extending parallel surfaces each of which is always in contact with one of said rollers.

References Cited in the file of this patent

UNITED STATES PATENTS

| Number | Name | Date |
| --- | --- | --- |
| 2,146,101 | Weber | Feb. 7, 1939 |
| 2,195,515 | Ferguson | Apr. 2, 1940 |
| 2,406,434 | Allen | Aug. 27, 1946 |

FOREIGN PATENTS

| Number | Country | Date |
| --- | --- | --- |
| 262,999 | Italy | Feb. 28, 1929 |